United States Patent [19]

Nakamura et al.

[11] 4,109,057
[45] Aug. 22, 1978

[54] METHOD FOR ACCELERATED CURING OF PHENOLIC RESIN ADHESIVES

[75] Inventors: Nobutaka Nakamura; Yukio Saeki; Shigeru Nemoto, all of Fujieda, Japan

[73] Assignee: Sumitomo Durez Company, Ltd., Tokyo, Japan

[21] Appl. No.: 799,639

[22] Filed: May 23, 1977

[30] Foreign Application Priority Data

May 24, 1976 [JP] Japan ................................ 51-59072

[51] Int. Cl.² ........................ B32B 21/08; C08L 5/00
[52] U.S. Cl. .................................. 428/528; 260/17.2; 260/17.3; 428/529; 428/531

[58] Field of Search ........................... 260/17.2, 17.3; 428/529, 528

[56] References Cited

U.S. PATENT DOCUMENTS 3,574,152  4/1971  Ligo ........................................ 260/6

Primary Examiner—Edward M. Woodberry
Attorney, Agent, or Firm—Peter F. Casella; James F. Mudd; William G. Gosz

[57] ABSTRACT

A method for accelerated curing of phenolic resin adhesives comprises adding powdered green tea to a thermosetting phenolic resin at about ambient temperature.

9 Claims, No Drawings

METHOD FOR ACCELERATED CURING OF PHENOLIC RESIN ADHESIVES

BACKGROUND OF THE INVENTION

Thermosetting phenolic resin adhesives may be prepared by reacting phenols, such as phenol or cresol, with aldehydes, such as formaldehyde or acetaldehyde, in a strongly alkaline medium. The phenolic adhesives are generally not compatible with ordinary acidic hardeners, and therefore require a higher curing temperature and a longer curing time in comparison with other thermosetting resin adhesives made from urea resins or melamine-urea co-condensed resins. Such higher curing temperatures and longer curing periods for phenolic adhesives inevitably lead to lower production yields of adhered products such as plywood. As a result, the commercial applications of phenolic resin adhesives have been significantly limited despite their excellent properties such as good bonding strength and water resistance.

Although various methods have been proposed for shortening the curing time of phenolic resin adhesives, these methods have not been generally successful in that the cost of formulating the adhesive with the various additives employed has been significant.

Accordingly, it is a principal object of this invention to provide a relatively inexpensive method for preparing a phenolic resin adhesive having enhanced bonding strength, water resistance, and curing time.

SUMMARY OF THE INVENTION

It has now been found that the addition of powdered green tea to a thermosetting phenolic resin adhesive results in a significant improvement in the curing time of the resin as well as improved physical properties of the bonded products derived therefrom. The present invention further provides a method for reducing the cost of phenolic adhesive compositions since the powdered green tea employed may be obtained as the inexpensive waste produced during the refining of crude tea in green tea production and which is usually discarded thereafter.

DESCRIPTION OF THE INVENTION

The phenolic resins employed in the present invention are thermosetting condensation products, i.e. resoles, obtained by reacting one mole of a phenol and one to three moles of an aldehyde in the presence of an alkaline catalyst, such as sodium hydroxide. Examples of the phenols which may be used to prepare these phenolic resins are phenol and substituted phenols such as cresol, and the like, as well as mixtures thereof. Aldehydes, suitable for use in this invention have 1 to 8 carbon atoms and include formaldehyde, formalin, paraformaldehyde, acetaldehyde, propionaldehyde, and the like, and mixtures thereof.

The phenolic resins of the instant invention are not limited to those specifically described above, but may also include other ingredients. For example, phenolic resins which are partly substituted by urea or lignin are within the scope of this invention.

The powdered green tea, suitable for use in the instant invention, may be derived from a variety of sources, which include, but are not limited to, the powdered waste produced during the refining of crude tea, as well as powdered tea prepared by pulverizing green tea commercially available for tea brewing. During the manufacture of green tea, the tea leaves are normally pulverized, in order to destroy the cellular fiber, and subsequently dried. The product, known as crude tea, is classified by particle size into several grades. The finest grades or sizes have the appearance of a powder and have little commercial value. It is this "powdered green tea" which is advantageously employed in the instant invention to facilitate dispersion in the phenolic resin. Preferably, the powdered green tea will have an average particle size of less than about 50 mesh.

As used in the specification and claims of this application, "green tea" denotes tea that is incompletely fermented before firing. The chemical components of green tea are known to include various amino acids, such as arginine, glutamic, and asparagine; alkaloids, such as caffeine, theobromine, guanine, xanthine, hypoxanthine, adenine, and theophylline, carbohydrates, such as cellulose, dextrin, pectin, glucose, sucrose, galactose, fructose, and xylose; various tannins and tannates, as well as other materials such as chlorophyl-carotinoids and flavone glycose.

The amount of powdered green tea which may be added to the phenolic resin in order to achieve the beneficial results of this invention will generally depend on the properties of the particular resin employed. Typically, the powdered green tea will be present in an amount of from about 0.5 to about 30 parts by weight, and preferably in a range of from about 5 to about 20 parts by weight, based on 100 parts by weight of phenolic resin. The limitation on the amount of powdered green tea added is not imposed by the curing behavior of the adhesive, but rather, is due to the increase in viscosity of the adhesive as it affects its processability, and the ability of the adhesive to spread easily when applied to a veneer or other wood product.

The adhesive compositions of the present invention may also contain fillers which are customarily used with aqueous adhesives, such as, for example, powdered cellulose materials such as walnut shell powder or wood flour, and starch-containing materials such as wheat flour, corn powder, or other cereal powders.

The following examples are presented to illustrate and explain more particularly the present invention, but it should be understood that the present invention is not limited thereby. The "parts" and "percentages" indicated in the specification and claims are by weight unless otherwise specified.

EXAMPLE 1

Phenol and formaldehyde, in a 1:2 molar ratio, respectively, were charged to a reactor and reacted under reflux conditions at a pH of about 11 in the presence of sodium hydroxide as catalyst until the viscosity at 25° C reached about 1.5 poise, thereby producing a phenolic resin with the following properties:

| | |
|---|---|
| Cure time (min/135° C) | 20 |
| Non-volatile content (%) | 41 |
| Compatibility with water (times/25° C) | 49 or higher |
| Free formaldehyde (%) | 0.7 |
| pH (25° C, glass electrode) | 10.8 |
| Viscosity (poise/25° C) | 1.6 |

100 parts of this phenolic resin were added at ambient temperature to 1–30 parts of powdered green tea, 90% of which was 50 mesh size or finer, prepared by pulverizing commercially available green tea. The curing times of these adhesives are shown in the following Table 1-1, which also contains green tea-free adhesive data as a point of reference.

TABLE 1-1

|  | Example 1 | | | | | Control Ex. 1 |
|---|---|---|---|---|---|---|
| Phenolic resin | 100 | 100 | 100 | 100 | 100 | 100 |
| Green tea | 1 | 5 | 10 | 20 | 30 | 0 |
| Cure time (min/135°) | 19 | 17 | 15 | 12 | 9 | 20 |

Four plywood samples were prepared with these adhesives under the following conditions. A control sample was also prepared with an adhesive not containing green tea.

TABLE 1-2

(1) Composition

|  | Example 1 | | | | Control Ex. 1 |
|---|---|---|---|---|---|
|  | No. 1 | No. 2 | No. 3 | No. 4 |  |
| Phenolic resin | 100 | 100 | 100 | 100 | 100 |
| Green Tea | 1 | 5 | 10 | 20 | 0 |
| Walnut shell | 10 | 8 | 5 | 0 | 10 |

(2) Experimental conditions
Composition: Lauan veneer (thickness 2mm, moisture content 7% or less) 3-ply
Spread: 36 ± 1 g/30 × 30 cm
Cold press: 20° C, 10 kg/cm², 30 min
Hot press: 135 ± 1° C, 10 kg/cm², 150 sec *1

*1: Hot press time per 1mm thickness of single veneer is 25 sec.

Bonding strengths of the plywood obtained are as follows (all figures are averages of ten measurements):

TABLE 1-3

|  | Example 1 | | | | Control Ex. 1 |
|---|---|---|---|---|---|
|  | No. 1 | No. 2 | No. 3 | No. 4 |  |
| Shear strength (kg/cm²) *2 | 2.5 | 5.7 | 12.1 | 11.9 | 0 |
| Wood failure (%) *2 | 0 | 15 | 48 | 52 | 0 |

*2: Boiled for 72 hours according to JAS, special class.

It is thus apparent that the addition of green tea to a thermosetting phenolic resin adhesive significantly shortens the curing time and improves the bonding strength in comparison with the control examples which do not contain green tea.

EXAMPLE 2

A phenolic resin having the following properties was employed in this example:

| Cure time (min/135° C) | 22 |
|---|---|
| Non-volatile content (%) | 47 |
| Compatibility with water (times/25° C) | 49 or higher |
| Free formaldehyde (%) | 0.9 |
| pH (25° C, glass electrode) | 10.5 |
| Viscosity (poise/25° C) | 2.1 |

100 parts of the above-described phenolic resin were added at ambient temperature to 1-30 parts of powdered green tea, 95% of which was 50 mesh size or finer. The curing times of these compositions are shown in the following Table 2-1, which also contains green tea-free adhesive data as a control.

TABLE 2-1

|  | Example 2 | | | | | Control Ex. 2 |
|---|---|---|---|---|---|---|
| Phenolic resin | 100 | 100 | 100 | 100 | 100 | 100 |
| Green tea | 1 | 5 | 10 | 20 | 30 | 0 |
| Cure time (min/135° C) | 21 | 19 | 16 | 13 | 10 | 22 |

Four plywood samples were prepared with these adhesives under the following conditions. As a control, a sample was also prepared with an adhesive not containing powdered green tea.

TABLE 2-2

(1) Composition

|  | Example 2 | | | | Control Ex. 2 |
|---|---|---|---|---|---|
|  | No. 1 | No. 2 | No. 3 | No. 4 |  |
| Phenolic resin | 100 | 100 | 100 | 100 | 100 |
| Green tea | 1 | 5 | 10 | 20 | 0 |
| Wheat flour | 6 | 4 | 2 | 0 | 6 |

(2) Experimental conditions
Composition: Lauan veneer (thickness 2mm, moisture content 7% or less) 3-ply
Spread: 36 ± 1 g/30 × 30 cm
Cold press: 20° C, 10 kg/cm², 30 min
Hot press: 135° C, 10 kg/cm², 3 min *3

*3: Hot press time per 1mm thickness of single veneer is 30 sec.

Bonding strengths of the plywood obtained are as follows (all figures are averages of ten measurements):

TABLE 2-3

|  | Example 2 | | | | Control Ex. 2 |
|---|---|---|---|---|---|
|  | No. 1 | No. 2 | No. 3 | No. 4 |  |
| Shear strength (kg/cm²) *2 | 4.7 | 6.5 | 10.3 | 12.1 | 2.0 |
| Wood failure % *2 | 10 | 15 | 42 | 48 | 8 |

*2: Conditioned as in Example 1.

It is thus apparent that the addition of powdered green tea to a thermosetting phenolic resin adhesive significantly shortens the curing time and improves the bonding strength in comparison with those adhesives which do not contain green tea.

EXAMPLE 3

Urea and formaldehyde in a 1:2 molar ratio, respectively, were charged to a reactor and reacted for 30 minutes at 100° C at a pH of about 8.5 in the presence of sodium hydroxide as a catalyst. Then, quantities of phenol were added such that the ratio of phenol to urea was 2:1 (molar ratio). To this mixture was added hydrochloric acid until a pH of 1 or lower was obtained, and reacted for 30 minutes at 100° C. An additional portion of formalin was then added in an amount such that the ratio of the above-mentioned phenol and additional formaldehyde was 1:2 (molar ratio). The mixture was reacted for 30 minutes at 100° C at a pH adjusted to about 11 by the addition of sodium hydroxide added as catalyst, thereby obtaining a resin having the following properties:

| Cure time (min/135° C) | 21 |
|---|---|
| Non-volatile content (%) | 47 |
| Compatibility with water (times/25° C) | 49 or higher |
| Free formaldehyde (%) | 0.9 |

-continued

| | |
|---|---|
| pH (25° C, glass electrode) | 11.2 |
| Viscosity (poise/25° C) | 2.6 |

100 parts of the above-described urea-modified phenolic resin were added at ambient temperature to 1–30 parts of the powdered green tea employed in Example 2. The curing times of these compositions are shown in the following table, which also shows a sample without green tea as a control.

TABLE 3-1

| | Example 3 | | | | | Control Example 3 |
|---|---|---|---|---|---|---|
| Urea-modified phenolic resin | 100 | 100 | 100 | 100 | 100 | 100 |
| Green tea | 1 | 5 | 10 | 20 | 30 | 0 |
| Cure time (min/135° C) | 20 | 17 | 15 | 11 | 9 | 21 |

Four plywood samples were prepared with these adhesives under the same conditions as in Example 2. A sample was also prepared without green tea as a control.

TABLE 3-2

| | Example 3 | | | | Control Example 3 |
|---|---|---|---|---|---|
| | No. 1 | No. 2 | No. 3 | No. 4 | |
| Urea-modified phenolic resin | 100 | 100 | 100 | 100 | 100 |
| Green tea | 1 | 5 | 10 | 20 | 0 |
| Wheat flour | 6 | 4 | 2 | 0 | 6 |

Bonding strengths of the plywood obtained are as follows (all figures averaged over 10 measurements).

TABLE 3-3

| | Example 3 | | | | Control Ex. 3 |
|---|---|---|---|---|---|
| | No. 1 | No. 2 | No. 3 | No. 4 | |
| Shear strength (kg/cm$^2$) *2 | 2.0 | 4.7 | 7.8 | 10.1 | 1.5 |
| Wood failure (%) *2 | 0 | 0 | 19 | 24 | 0 |

*2: Conditioned as in Example 1

It is thus apparent that in a urea-modified phenolic resin adhesive the addition of green tea significantly shortens the curing time and improves the bonding strength of the adhesive.

What is claimed is:

1. A method for accelerated curing of a phenolic resin adhesive comprises adding powdered green tea to a thermosetting phenolic resin at about ambient temperature and curing said thermosetting resin by heating.

2. The method of claim 1 wherein said powdered green tea is present in an amount of about 0.5 to about 30 parts by weight based on 100 parts by weight of thermosetting phenolic resin.

3. The method of claim 2 wherein said powdered green tea is present in an amount of about 5 to about 20 parts by weight based on 100 parts by weight of thermosetting phenolic resin.

4. The method of claim 1 wherein said powdered green tea comprises particles of an average size of less than about 50 mesh.

5. The method of claim 1 wherein said thermosetting phenolic resin comprises a phenol-formaldehyde condensation product.

6. The method of claim 1 wherein said thermosetting phenolic resin comprises a urea-formaldehyde condensation product.

7. The method of claim 1 wherein said adhesive contains a filler material.

8. An adhesive composition prepared according to the method of claim 1.

9. A plywood article which is bonded with the adhesive composition of claim 8.

* * * * *